(12) United States Patent
Bunnag et al.

(10) Patent No.: US 9,009,966 B2
(45) Date of Patent: Apr. 21, 2015

(54) INTERNAL/EXTERNAL SINGLE EXPANSION RAMP NOZZLE WITH INTEGRATED THIRD STREAM

(71) Applicant: Northrop Grumman Systems Corporation, Falls Church, VA (US)

(72) Inventors: Shane Bunnag, Van Nuys, CA (US); Gordon Hall, Mammoth Lakes, CA (US); Kelly Strominger, Hawthorne, CA (US); John Tapee, Redondo Beach, CA (US); Trajaen J. Troia, Hermosa Beach, CA (US)

(73) Assignee: Northrop Gurmman Systems Corporation, Falls Church, VA (US)

( * ) Notice: Subject to any disclaimer, the term of this patent is extended or adjusted under 35 U.S.C. 154(b) by 431 days.

(21) Appl. No.: 13/842,567

(22) Filed: Mar. 15, 2013

(65) Prior Publication Data

US 2014/0259631 A1 Sep. 18, 2014

(51) Int. Cl.
*B21K 25/00* (2006.01)
*F02K 1/00* (2006.01)
*F02K 1/78* (2006.01)

(52) U.S. Cl.
CPC .... *F02K 1/00* (2013.01); *F02K 1/78* (2013.01)

(58) Field of Classification Search
USPC ......... 29/889, 889.2, 889.22, 890.01; 60/767, 60/768, 770, 771
See application file for complete search history.

(56) References Cited

U.S. PATENT DOCUMENTS

| | | | |
|---|---|---|---|
| 3,146,584 A | | 9/1964 | Smith et al. |
| 3,896,615 A | * | 7/1975 | Slatkin et al. ............... 60/204 |
| 4,567,960 A | * | 2/1986 | Johnson et al. ............... 181/220 |
| 6,178,740 B1 | | 1/2001 | Su et al. |
| 6,574,964 B1 | * | 6/2003 | Haggander et al. ............ 60/770 |
| 6,948,317 B2 | | 9/2005 | Renggli et al. |
| 7,837,142 B2 | | 11/2010 | Chase et al. |
| 7,967,241 B2 | | 6/2011 | Chase et al. |
| 2009/0158703 A1 | | 6/2009 | Petty |
| 2009/0211258 A1 | * | 8/2009 | Bulman ......................... 60/770 |

(Continued)

FOREIGN PATENT DOCUMENTS

EP 1607610 12/2005

OTHER PUBLICATIONS

Hall, Gordon, Experimental Investigation of a Novel VTOL Thrust Vectoring Nozzle, Jul.-Aug. 1965, pp. 312-317, vol. 2, No. 4 Hawthorne, California.

(Continued)

*Primary Examiner* — Ryan J Walters
(74) *Attorney, Agent, or Firm* — Stetina Brunda Garred & Brucker

(57) ABSTRACT

The construction of an internal/external single expansion ramp nozzle (nxSERN), and method of designing the same, is provided. Initial design parameters for primary stream construction are selected and additional parameters are determined by isentropic relations using the selected design parameters and Prandtl-Meyer function. The nozzle throat input and output angles are determined and used to define an initial portion of the nozzle primary stream lower expansion surface. The nozzle primary stream upper expansion surface and an aft portion of the primary stream lower expansion surface are defined using a method of characteristics. Initial and aft portions of the primary stream lower expansion surface are then connected by a straight line to define the primary stream nozzle.

8 Claims, 4 Drawing Sheets

(56) References Cited

U.S. PATENT DOCUMENTS

| | | |
|---|---|---|
| 2009/0241550 A1 | 10/2009 | Petty et al. |
| 2009/0255269 A1 | 10/2009 | Petty et al. |
| 2010/0043393 A1 | 2/2010 | Zamora et al. |
| 2011/0062290 A1 | 3/2011 | Chase et al. |

OTHER PUBLICATIONS

Re et al, Static internal performance of single expansion-ramp nozzles with thrust vectoring and reversing. NASA. Mar. 1982; 144 pages.

* cited by examiner

INTERNAL/EXTERNAL SINGLE EXPANSION RAMP NOZZLE WITH INTEGRATED THIRD STREAM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to jet aircraft exhaust nozzles and, more particularly, to methods of design and the construction of a supersonic nozzle that has a fixed exit area, a shallow boat tail and a shock free operation at the designed pressured ratio.

A propelling nozzle is the component of a jet engine that operates to constrict the flow, to form an exhaust jet and to maximize the velocity or propelling gases from the engine. Propelling nozzles can be subsonic, sonic, or supersonic. Physically the nozzles can be convergent, or convergent-divergent. Convergent-divergent nozzles can give supersonic jet velocity within the divergent section, whereas in a convergent nozzle the exhaust fluid cannot exceed the speed of sound within the nozzle.

Propelling nozzles can be fixed geometry, or they can have variable geometry, to give different throat and exit diameters so as to deal with differences in ambient pressure, flow and engine pressure; this permitting improvement of thrust and efficiency.

A propelling nozzle operates by using its narrowest part, or "throat", to increase pressure within the engine by constricting airflow, then expanding the exhaust stream to, or near to, atmospheric pressure, and finally forming it into a high speed jet to propel the vehicle.

The energy to accelerate the stream comes from the temperature and pressure of the gas, the gas cools, expands, and accelerates, with the heat and pressure of exhaust gas being proportional to its speed.

Air-breathing engines create forward thrust on the airframe by imparting a net rearward momentum onto the air via producing a jet exhaust gas, which, when fully expanded, has a speed that exceeds the aircraft's airspeed.

Engines that are required to generate thrust quickly from idle use propelling nozzles with variable area. While at idle, the nozzle is set to its open configuration for minimum thrust and high engine rpm, but when thrust is needed, e.g. while initiating a go-around, constricting the nozzle will quickly generate thrust.

Almost all nozzles have a convergent section because it increases the pressure in the rest of the engine-potentially yielding more thrust by acting on the forward sections. It is important to note that convergent nozzles end with this convergent section, and in general, narrower convergent nozzles give lower thrust and higher exhaust speed, but wider convergent nozzles give lower exhaust speed and higher thrust.

Simple convergent nozzles are used on many jet engines. If the nozzle pressure ratio is above the critical value of 1.8:1, a convergent nozzle will choke, resulting in some of the expansion to atmospheric pressure taking place downstream of the throat, i.e. smaller flow area, in the jet wake. Although jet momentum still produces much of the gross thrust, the imbalance between the throat static pressure and atmospheric pressure still generates some pressure thrust.

The high nozzle pressure of convergent nozzles often cause the pressure of exhaust exiting the engine to exceed the pressure of the surrounding air and thereby reduce efficiency by causing much of the expansion to take place downstream of the nozzle itself. Consequently, some engine, e.g. rockets, incorporates a convergent-divergent nozzle which cause more of the exhaust to expand against the inside of the nozzle.

Engines for jet aircraft may be constructed as fixed exhaust nozzle systems and/or variable exhaust nozzle systems. Fixed exhaust nozzle systems are commonly used on varies types of commercial aircraft, and some military aircraft. Variable exhaust nozzle systems are commonly used on supersonic military aircraft, and which allow for kinetically changing the shape of the nozzle to accommodate for different thrust levels and other factors. While such variable exhaust nozzle systems provide certain advantages, they also introduce added complexity, expense, and in some cases, may require compromises in other areas of operation.

Fixed exhaust nozzle systems are commonly designed for specific thrust levels to make them very efficient. However, fixed exhaust nozzle systems may also be designed to define flow paths to accommodate changes in thrust levels without the need of added expense and complexity of the variable exhaust nozzle systems. The present invention is directed to such a fixed exhaust nozzle system.

Fixed nozzle designs, as described herein, include single expansion ramp nozzles (SERNs) that partially expand the exhaust gas internally, within the nozzle. The remainder of the exhaust gas expands external to the SERN.

A properly designed SERN typically allows the exhaust gas to automatically expand according to the ambient pressure, without using a variable of the geometric nozzle. SERNs are desirable for applications where nozzle pressure can vary widely throughout the flight envelope. However, SERN nozzles require a specific flow angle (dictated by the Prandtl-Meyer Theory), where the throat plane is able to achieve a thrust vector angle of zero at the design pressure ratio. This angle is often steep relative to the direction of flight. As a result the boat tail angle of the outer mold line (OML) at the last enclosed area of the exhaust duct (i.e. the throat plane of a SERN) is steep. The drag penalty associated with this arrangement is severe enough to obviate a use of a SERN in thrust-drag optimized nozzle configuration.

To reduce the flow angle required at the throat of the SERN, and reduce the boat tail angle, some of the flow expansion can be undertaken within the SERN. The angle of the partially expanded flow is much shallower compared to a conventional SERN. The remainder of the expansion is undertaken by an external ramp. This type of arrangement is referred to as an nxSERN, which owes its name to the unique internal/external arrangement of isentropic geometries. All of the advantages embodied in the conventional SERN are retained in the nxSERN concept, with the added benefit of reduced boat angle.

U.S. Pat. No. 3,146,584 (Jet Propulsion Nozzle) describes a conventional SERN nozzle as described above. While such a nozzle takes advantage of the CFG performance benefit provided by a SERN, it presents integration challenges due to the boat tail angle issues described above. It also provides no means for integrating a third stream exhaust without disrupting the main exhaust flow.

U.S. Pat. No. 6,948,317 (Methods and Apparatus for Flade Engine Nozzle) ('317 Patent) is also representative of a conventional SERN. While the boat tail issues associated with SERN are alleviated, in the disclosed design, the CFG performance is compromised. Additionally, the provision for a third stream exhaust still disrupts the flow even though the provision is built into the design. Moreover, the internal surface of the outer flap as described in the '317 Patent is an undefined curve that can degrade CFG performance at any pressure ratio. Similarly, the "ramp flap" and "flade flap" shown in the '317 Patent are undefined curves that are not optimized for CFG performance.

While much is known regarding the design of a fixed exhaust nozzle system, engine manufactures have generally lacked the capability to design a conceptual nozzle flow path from a compressible flow first principles. Instead, such manufacturers have been commonly used a design process starting with a preconceived nozzle flow path, fine-tuned by the integrated process of experimentation, followed by CFT analysis to fine-tune the design concepts. This brute force approach is time consuming and leaves the manufacturers with no clear method of achieving an optimized solution. The introduction of the nozzle design methodology, defining a flow path for compressible flow first principles is desirable to allow nozzle designs to proceed from more precise initial concepts, even if the nozzle designs are subsequently tailored for optimization in view of the other criteria, e.g. low observable characteristics.

BRIEF SUMMARY

The construction of an internal/external single expansion ramp nozzle (nxSERN), and method of designing the same, is provided. Initial design parameters for primary stream construction are selected and additional parameters are determined by isentropic relations, using the selected design parameters and Prandtl-Meyer function. The nozzle throat input and output angles are determined and used to define an initial portion of the nozzle primary stream lower expansion surface. The nozzle primary stream upper expansion surface and an aft portion of the primary stream lower expansion surface are defined using the Method of Characteristics (MoC).

Initial and aft portions of the primary stream lower expansion surface are then connected by a straight line to define the primary stream nozzle.

A third stream nozzle may be integrated within the nxSERN nozzle. The third stream nozzle is designed in a manner generally similar to the design of the primary stream nozzle. The third stream nozzle design parameters are selected, and other design parameters are determined using the selected parameters and Prandtl-Meyer function. The nozzle third stream upper expansion surface and an aft portion of the third stream lower expansion surface are defined using MoC. Initial and aft portions of the third stream lower expansion surface are then connected by a straight line to define the third stream nozzle.

The aft end of the third stream upper expansion surface is intersected with the primary stream lower expansion surface, and downstream portions of both are deleted. Characteristic lines extending from the aft portion of the primary stream upper expansion surface are extended downstream and outward to define an aft portion of the third stream lower expansion surface, using MoC. The slope of the remaining portion of the third stream expansion surface is calculated such that the static pressure in the third stream matches the static pressure in the primary stream. The initial and aft portions of the third stream lower expansion are then connected to complete the third stream nozzle.

The construction of an nxSERN having a single flow path, or having a primary and third stream flow paths may then be implemented in accordance with the selected/determined design parameters provided as set forth above.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
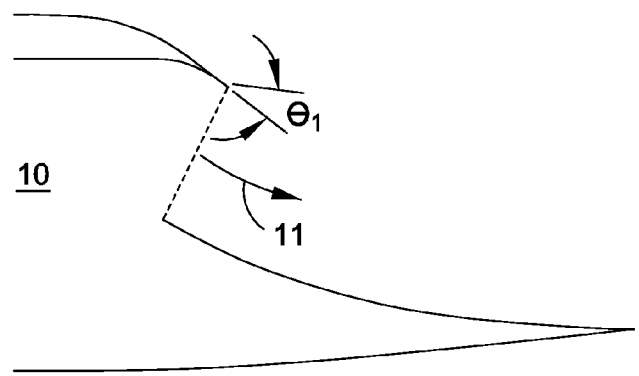
FIG. 1 is an illustration of a conventional SERN nozzle.

The detailed description below is given by way of example, and not limitation. Given the above disclosure, one skilled in the art could devise variations that are within the scope and spirit of the invention disclosed herein. Further, the various techniques and features of the embodiments disclosed herein can be used alone, or in varying combinations with each other, and are not intended to be limited to the specific combinations described herein. Thus, the scope of the claims is not to be limited by the illustrated embodiments.

In general, the nxSern nozzle described herein combines the CFG performance of a SERN with the features of a modern survivable asymmetric nozzle; specifically, the shallow boat tail angle and the provisions for a third stream. The result is a nozzle that achieves high CFG performance over the entire range of nozzle pressure ratios without requiring a compromise to the drag performance of the air vehicle. Performance of the nxSERN is not degraded with the introduction of a third stream. This makes it desirable for use on all engines featuring a third stream.

To reduce the flow angle, and thus the boat tail angle at the throat of a traditional SERN, some of the flow expansion can be undertaken within an "internal SERN" flow path, with the remainder of the expansion occurring on an external ramp. The upper surface exit flow path angle of a partially expanded flow is much shallower compared to a traditional SERN for the same design nozzle pressure ratio (NPR). This arrangement is called an nxSERN, which owes its name to the unique internal/external arrangement of isentropic SERN geometries.

All of the competitive advantages embodied in a conventional SERN are retained in the nxSERN concept described herein, with the added benefit of reduced boat tail angle. Additionally, the flow field within the nxSERN flow path is highly compatible with the integration of a third stream due to a large region of constant pressure on the lower surface.

The present invention allows the design of a novel flow path geometries using MoC. Characteristics lines (lines of constant Mach number) are extended from an initial expansion surface at angles prescribed by MoC. This initial expansion surface is usually taken to be circular arc, but can be any appropriate surface. In this implementation of MoC, the angles of the boundaries (and hence the flow angles) are known and Mach numbers are solved for. The lengths of the characteristics lines are determined by the flow rate in the exhaust streamtube. The locus of the endpoints of these lines forms the upper expansion surface. To define the lower surface, this process is repeated with lines extending from the trailing edge of the upper surface. There is a triangle-shaped region (formed by the end of the initial expansion surface, the trailing edge of the upper surface, and the beginning of the downstream expansion surface) where the flow properties do not change.

Throat height, design pressure ratio, and internal expansion ratio are inputs required to generate a flow path. If the third stream integration is required, then the throat height and total pressure of the third stream nozzle are also required inputs. The process for generating the internal portion of the third stream nozzle is identical to the process described above for the main engine nozzle. However, the pressure ratio, and hence the expansion ratio, of this nozzle is referenced to the local static pressure of the main nozzle. As such, the third stream nozzle exit can be placed anywhere in that region without having to redesign to the local static pressure. The flexibility of this arrangement is advantageous in terms of third stream utilization (i.e. cooling) and packaging.

In the disclosed embodiment the initial criteria was selected based on notional mission profile containing a 60,000 feet, Mach 2.2 supercrusie segment and at 36,000 feet, Mach 0.08 loiter segment. However, the design process disclosed herein is applicable across the range of operating nozzle pressure ratios and flight conditions.

The criteria used in the described embodiment was selected to achieve the best balance of internal performance (CFG) and associated installation penalties (boat tail drag, thrust vector angle, etc.) across the range of operating pressure ratios. Studies have also suggested that nozzle designs should be biased toward lower pressure ratios to avoid overexpansion losses, which are much more severe than losses due to under expansion. A design NPR of 7 was, therefore, chosen as a compromise between performance fall-offs due to overexpansion at low operating NPR and under expansion at high operating NPR.

For optimum performance with the main nozzle, the third stream was designed so that the slip line that forms between the main engine exhaust and the third stream exhaust mimics the downstream lower expansion surface. Therefore the downstream portion of the lower expansion surface can be deleted and replaced with a geometrically identical "virtual expansion surface" that represents the slip line. Characteristics lines are extended downstream from the slip line at angles prescribed by MoC. In this implementation of using MoC, the Mach number (and hence the static pressure) at the slip line is known, and the flow angles needed to achieved the same static pressure in the third stream exhaust flow are solved for.

As further described below, the lengths of the characteristics lines are determined by the flow rate in the third stream exhaust streamtube. The locus of the endpoints of these lines forms the new downstream lower expansion surface. At design conditions, the static pressure of the main exhaust and the third stream exhaust are equal and the flow behaves as if there is a solid boundary between them. Deviations in this prediction may occur, due to mixing layer effects, but have been found to be are relatively minor.

The MoC was used to produce nxSERN flow paths and the integrated third stream nozzle geometries. Lines of constant Mach number are extended form an initial expansion surface at angles prescribed by MoC. The lengths of these lines are representative of the flow rate in the exhaust streamtube. The locus of the endpoints of these lines forms the upper expansion surface. To define the lower surface, this process is repeated with lines extending from the trailing edge of the upper surface. The design process is parametric and the contours of the flow path are defined from the first principles so that no guesswork is required to generate a nozzle geometry that achieves CFG≈1 at the design pressure ratio. Throat height, design pressure ratio, and internal expansion ratio are typically the only inputs required to generate a flow path for analysis by CFD. If third stream integration is required, then the throat height and total pressure of the third stream nozzle are also required inputs.

As noted above, the process for generating the internal portion of the third stream nozzle is substantially identical to the process described above for the primary nozzle. However, the pressure ratio and hence the expansion ratio, of this nozzle is referenced to the local static pressure of the main nozzle, not ambient. The new external expansion surface is formed by tailoring the local ramp angles such that the resultant Mach number yields a local static pressure equal to that of the main exhaust flow.

The design process may be facilitated by the use of commercial design programs, such as CATIA (Computer Aided Three-dimensional Interactive Application). CATIA is a multi-platform CAD/CAM/CAE commercial software suite developed by the French company Dassault Systemes, written in the C++ programming language.

An exemplary process for designing an nxSERN nozzle in accordance with the present invention, proceeds as follows:

1. Select the initial design criteria
   aircraft speed (M)=Mach 2.2;
   nozzle pressure ratio (NPR)=7;
   nozzle expansion ratio (A081/A080)=1.3; and
   specific heat ratio ($\gamma$)=1.4
2. Determine basic parameters from isentropic relationships and Prandtl-Mayer function $M_{081} = f(A081/A080) = 1.6588;$ $nu_{081} = f(M081) = 16.5989;$ $M_{090} = f(NPR) = 1.9283;$ and $nu_{090} = 24.3830$ 3. Determine flow angle at Plane 081 ($\theta_{081}$) required for zero pitch vector at end of external section ($\theta_9=0$)

$\theta_{081} = nu_{090} - nu_{081} = 7.7841°;$

4. Determine expansion angle required to achieve specified $M_{081}$ at end of internal section. Offset by $\theta_{081}$ to find the flowpath entry angle ($\theta_{080}$)

$nu_{081} - nu_m = 16.5989°$ $\theta_{080} = 16.5989 - \theta_{081} = 8.8148°;$

5. Layout initial expansion surface by creating a circular arc with a radius equal to the height of the throat (can be parameterized to any convenient value). Fix one endpoint to (0,0) and tangencies to $\theta_{080}$ and $\theta_{081}$. Opposite endpoint and arc center are constrained by arc geometry;
6. Extend characteristic lines from initial expansion surface downstream and outward. Angle and length are determined by MoC $h/h^* = 1/\sin(\mu) \times A/A^*;$ 7. Layout upper IML by connecting locus of characteristic line end points. Mach number and direction are constant along characteristics;
8. Extend characteristic lines from trailing edge of upper IML downstream and outward. Angle and length are determined by MoC $h/h^* = 1/\sin(\mu) \times A/A^*$;

9. Layout curved section of lower ramp by connecting locus of characteristic line end points. Mach number and direction are constant along characteristics;
10. Layout curved section of lower ramp by connecting locus of characteristic line end points. Mach number and direction are constant along characteristics;
11. Repeat design procedures for initial expansion surface and upper IML for the third stream nozzle;
12. Replace lower ramp aft of third stream with "virtual surface";
13. Extend characteristics lines from virtual surface downstream and outward. Angle and length determined by MoC; and
14. Calculate slope of curved section of new lower ramp for Mach number needed to match static pressure in the primary stream.

Referring to the drawings, an implementation of one embodiment of the present invention is illustrated and described as follows:

FIG. 1 illustrates construction of a prior art SERN having a boat tail angle $\theta_1$. As described above, such a construction suffers from significant drag penalties.

Figure 2:
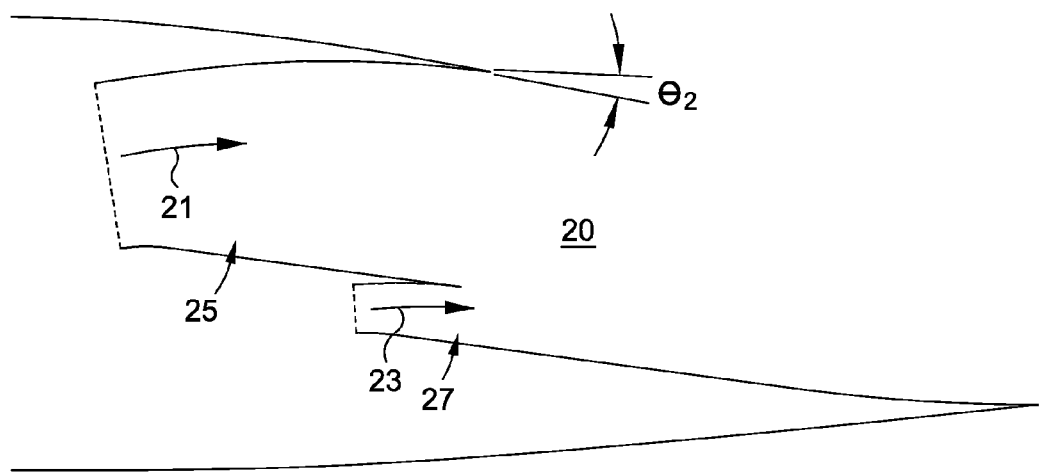
FIG. 2 is an illustration of one embodiment of nxSERN nozzle in accordance with the present invention, incorporating a third stream flow path.

FIG. 2 illustrates a construction of an nxSERN nozzle, 20, in accordance with the present invention, which includes the primary nozzle 25, defining a primary flow path 21, and third nozzle, 27, defining a third stream flow path 23. The boat tail angle associated with such a construction, $\theta_2$, is significantly less than that of the conventional SERN shown at FIG. 1.

Figure 3:
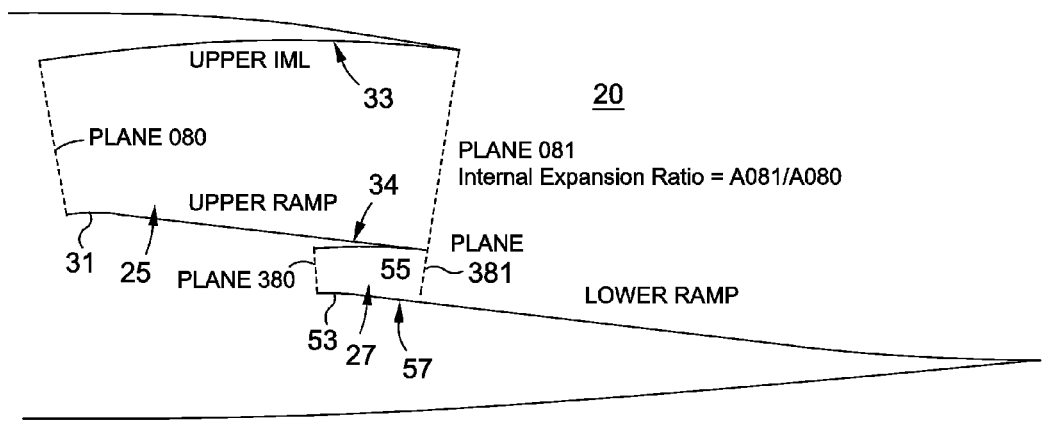
FIG. 3 is an illustration of an nxSERN nozzle, illustrating planes of interest.
Figure 4:
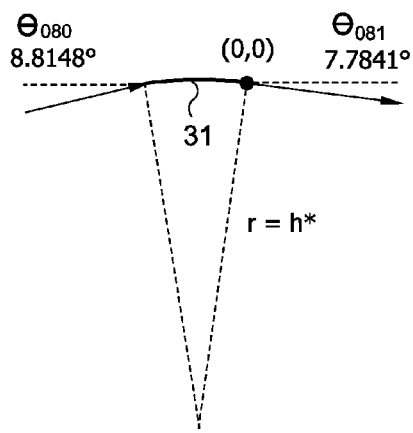
FIG. 4 is an illustration the design of an initial portion of the primary stream lower expansion surface.

FIG. 3 further illustrates features of the nxSERN nozzle shown at FIG. 2. As shown at FIG. 3, the primary nozzle 25 incorporates upper expansion surface 33 (or upper inner mold line (IML)), and a lower expansion surface 34, or lower ramp. The third stream nozzle 27 includes an upper expansion surface 55 and lower expansion surface 57. As explained in more detail, the primary nozzle lower expansion ramp 34 and the third stream nozzle upper expansion surface 55 may be truncated from their original design length.

As also shown at FIG. 3, the design process of the present invention proceeds by defining planes 080 and 081, the areas of which define the expansion ratio of the primary stream nozzle (A081/A080). The initial portion 31 of the primary stream nozzle is thereby defined. Similarly, planes 380 and 381 are used to define initial portion 53 of the third stream nozzle lower expansion surface.

The Prandtl-Meyer function is also utilized to determine basic parameters of the nozzle construction. Prandtl-Meyer function describes the angle through which a flow can turn isentropically for the given initial and final Mach number. It is the maximum angle through which a sonic (M=1) flow can be turned around a convex corner. For an ideal gas, it is expresses as follows:

$$v(M) = \int \frac{\sqrt{M^2 - 1}}{1 + \frac{\gamma - 1}{2} M^2} \frac{dM}{M}$$

$$= \sqrt{\frac{\gamma + 1}{\gamma - 1}} \cdot \arctan \sqrt{\frac{\gamma - 1}{\gamma + 1}(M^2 - 1)} - \arctan \sqrt{M^2 - 1}$$

where $v$ is the Prandtl-Meyer function, M is the Mach number of the flow and $\gamma$ is the ratio of the specific heat capacities.

By convention, the constant of the integration is selected such that $v(1)=0$.

As Mach number varies from 1 to $\infty$, $v$ takes the values from 0 to $v_{max}$ where $$v_{max} = \frac{\pi}{2}\left(\sqrt{\frac{\gamma + 1}{\gamma - 1}} - 1\right)$$

For isentropic expansion, $v(M_2)=v(M_1)+\theta$
For isentropic compression, $v(M_2)=v(M_1)-\theta$
where, $\theta$ is the absolute value of the angle through which the flow turns M is the flow Mach number and the suffixes "1" and "2" denote the initial and final conditions respectively.

Figure 5:
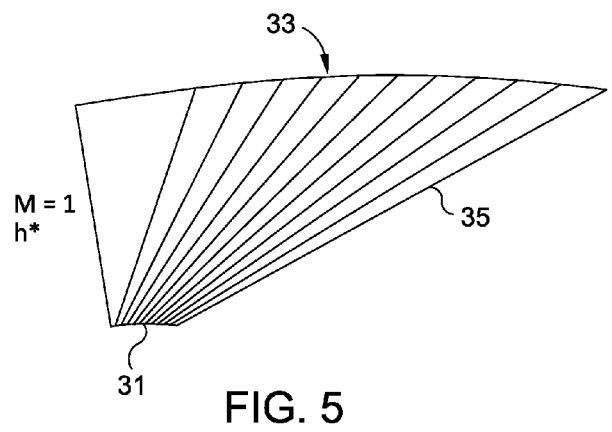
FIG. 5 further illustrates the design of the primary stream upper expansion surface.

Returning again to the drawings, FIG. 5 illustrates using MoC to define the primary nozzle upper expansion surface 33. As described above, a series of characteristics lines are extending from the initial portion 31 of the lower expansion surface to define the upper nozzle expansion surface 33.

Figure 6:
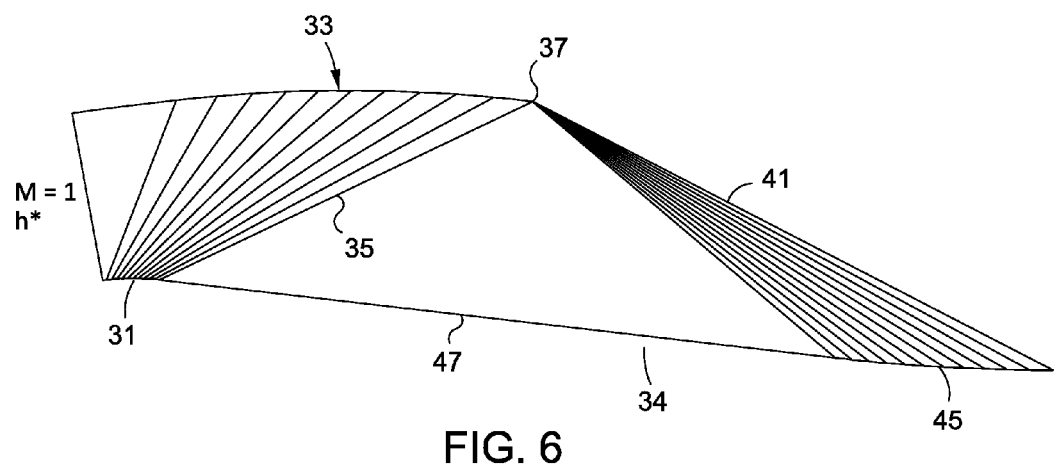
FIG. 6 further illustrates the design of a complete primary stream lower expansion surface.

FIG. 6 further illustrates using MoC to define aft portion 45 of the lower expansion surface 34. The process proceeds by defining a plurality of characteristic lines 41 which extends from the aft edge 37 of the primary nozzle upper expansion surface 33. Once the aft portion 45 of the lower expansion surface 34 is defined, portions 31 and 45 may be connected by a straight line to form intermediate portion 47, thereby completing the primary nozzle lower expansion surface 34.

Figure 7:
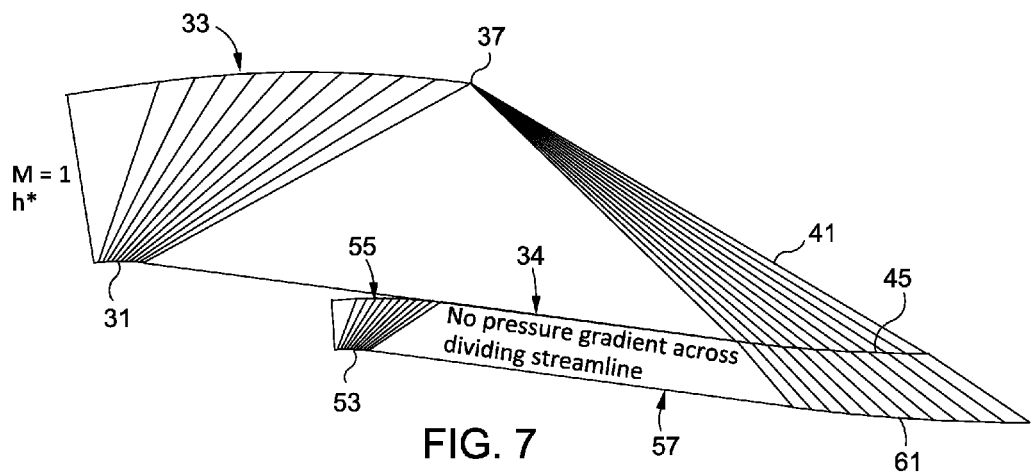
FIG. 7 further illustrates the design of the third stream upper and lower expansion surface.

FIG. 7 further illustrates the construction of third stream nozzle 27, adjacent primary nozzle 25. As with the construction of the primary nozzle 25, design of third stream nozzle 27 proceeds by defining planes 380 and 381 (shown at FIG. 3) and determining initial portion 53 of the third stream nozzle lower expansion surface 57. Using MoC, the third stream nozzle upper expansion surface 55 may then be determined.

The aft portion 61 of the third stream nozzle lower expansion surface 57 may be formed by extending characteristic lines 41 beyond the primary nozzle lower expansion surface 37, using MoC. Once the aft portion 61 is defined, the initial portion 53 and aft portion 61 of the third stream nozzle lower expansion surface may be connected by a straight line, having the slope defined to avoid pressure gradients between the primary stream flow and the third stream flow.

Figure 8:
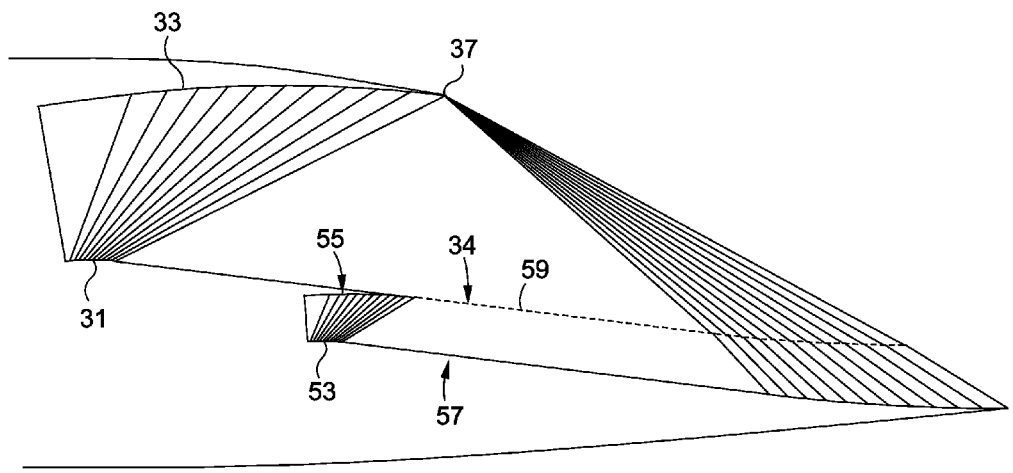
FIG. 8 further illustrates the removal of the surface portion bounding the primary stream and third stream.

As shown at FIG. 8, portions 59 of the primary nozzle lower expansion surface 34 and the third stream upper expansion surface 55, the aft intersection of the primary nozzle lower expansion surface 34 and the third stream nozzle upper expansion surface 55 may be eliminated, given the absence of pressure gradient across the two streams.

What is claimed is:

1. A method of designing an internal/external single expansion ramp nozzle (nxSERN) comprising:
   a. selecting SERN design parameters for nozzle primary stream throat height, nozzle pressure ratio and nozzle internal expansion ratio;
   b. determining additional nozzle primary stream SERN parameters from isentropic relationships using the selected SERN design parameters and a Prandtl-Meyer function;

c. determining a nozzle primary stream throat input angle at A080;
d. determining a nozzle primary stream throat output angle at A081;
e. connecting the nozzle primary stream throat input angle at A080 and the nozzle primary stream throat output angle A081 by a constant radius arc to define an initial portion of a nozzle primary stream lower expansion surface;
f. defining a nozzle primary stream system upper expansion surface using MoC;
g. defining an aft portion of the primary stream lower expansion surface, using MoC; and
h. connecting the initial and aft portions of the primary stream lower expansion surface by a straight line.

2. The method as recited in claim 1 further including the step constructing a third stream nozzle within the nxSERN, the third stream nozzle being constructed as follows:
a. selecting SERN design point parameters for nozzle third stream throat height, nozzle pressure ratio and nozzle internal expansion ratio;
b. determining additional nozzle third stream SERN parameters from isentropic relationships using the selected SERN third stream design parameters and a Prandtl-Meyer function;
c. determining a nozzle third stream throat input angle at A380;
d. determining a nozzle third stream throat output angle at A381;
e. connecting the nozzle third stream throat input angle at A380 and the a nozzle third stream throat output angle at A381 by a constant radius arc to define an initial portion of the nozzle third stream lower expansion surface;
f. defining a nozzle third stream system upper expansion surface using MoC;
g. intersecting an aft end of the third stream upper expansion surface with the primary stream lower expansion surface;
h. deleting portions of the primary stream lower expansion surface and the third stream upper expansion aft of the intersection of the primary stream lower expansion surface and the third stream upper expansion surface;
i. extending characteristic lines from the aft portion of the primary stream upper expansion surface downstream and outward, to define an aft portion of the third stream lower expansion surface, using MoC;
j. calculating the slope of the aft portion of the third stream lower expansion surface needed to match static pressure in primary stream; and
k. connecting the initial portion of the third stream lower expansion surface to the aft portion of the third stream lower expansion surface.

3. The method as recited in claim 2 further including the step of fabricating an nxSERN.

4. The method as recited in claim 1 further including the step of fabricating an nxSERN.

5. A method of designing an internal/external single expansion ramp nozzle (nxSERN) comprising:
a. specifying a representative aircraft speed (M);
b. specifying a desired nozzle pressure ratio (NPR);
c. specifying a desired nozzle expansion ratio representing a ratio between nozzle throat input plane area and throat output plane area (A080/A081);
d. specifying a representative specific heat ratio ($\gamma$);
e. specifying the height of a primary stream exhaust nozzle throat (h);
f. calculating a Prandtl-Meyer function;

g. determining an expansion angle at plane A081 ($\theta_{A081}$) required to achieve forward thrust;
h. determining an expansion angle ($\theta_{A080}$) at a forward end of an initial portion of a primary stream lower expansion surface required to achieve a Mach number $M_{A081}$ at an aft end of the initial portion of the primary stream lower expansion surface;
i. laying out the initial portion of the primary stream lower expansion surface by creating a circular arc connecting the forward and aft ends of the initial portion of the primary stream lower expansion surface, the arc having a radius equal to the specified height of the primary stream nozzle throat;
j. extending characteristic lines along the initial portion of the primary stream lower expansion surface portion outward and downstream, as determined by using MoC, to define a first locus of characteristic end points;
k. connecting the first locus of characteristic end points to define a primary stream upper expansion surface;
l. extending characteristic lines from an aft end of the primary stream upper expansion surface downstream and outward, as determined by MoC, to define a second locus of characteristic end points;
m. connecting the second locus of characteristic end points to define an aft portion of the primary stream lower expansion surface; and
n. laying out an intermediate portion of the primary stream lower expansion surface by connecting the initial and aft portions of the primary stream lower expansion surface by a straight line.

6. The method as recited in claim 5 further including the step constructing a third stream nozzle within the nxSERN, the third stream nozzle being constructed as follows:
a. specifying a height of third stream nozzle throat;
b. determining an expansion angle at A380 required to achieve forward thrust;
c. determining an expansion angle at A381 to achieve a specified Mach number M381 at an aft end of an initial portion of a third stream lower expansion surface;
d. laying out the initial portion of the third stream lower expansion surface by creating a circular arc connecting the expansion angles at A380 and A381, the arc having a radius equal to the specified height of the third stream nozzle throat;
e. extending characteristic lines along the initial portion of the third stream lower expansion surface downstream and outward, using MoC, to define a third locus of characteristic end points;
f. connecting the third locus of characteristic end points to define a third stream upper expansion surface;
g. intersecting the aft end of the third stream upper expansion surface with the primary stream lower expansion surface;
h. deleting portions of primary stream lower expansion surface and third stream upper expansion surface aft of the intersection of the primary stream lower expansion surface and the third stream upper expansion surface;
i. extending characteristic lines from a trailing edge of the primary stream upper expansion surface downstream and outward, as determined by MoC, to define a fourth locus of characteristic end points;
j. connecting the fourth locus of characteristic end points to define an aft portion of the third stream lower expansion surface;
k. calculating the slope of the aft portion of the third stream lower expansion surface needed to match a static pressure in primary stream; and l. connecting the initial portion of the third stream lower expansion surface to the aft portion of the third stream lower expansion surface with a straight line at the calculated slope.

7. The method as recited in claim 6 further including the step of fabricating an nxSERN.

8. The method as recited in claim 5 further including the step of fabricating an nxSERN.

\* \* \* \* \*